(12) United States Patent
Kanehara (10) Patent No.: US 9,561,790 B2
(45) Date of Patent: Feb. 7, 2017

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventor: Masato Kanehara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 14/489,656

(22) Filed: Sep. 18, 2014

(65) Prior Publication Data

US 2015/0094892 A1    Apr. 2, 2015

(30) Foreign Application Priority Data

Oct. 2, 2013   (JP) ................. 2013-207380

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2016.01) |

(Continued)

(52) U.S. Cl.
CPC .......... *B60W 20/106* (2013.01); *B60K 6/442* (2013.01); *B60K 6/445* (2013.01); *B60W 10/06* (2013.01); *B60W 10/08* (2013.01); *B60W 10/26* (2013.01); *B60W 20/13* (2016.01); *B60W 30/182* (2013.01); *B60W 50/082* (2013.01); *B60W 50/085* (2013.01); *B60W 2540/10* (2013.01); *B60W 2710/083* (2013.01); *B60W 2710/244* (2013.01); *Y02T 10/6239* (2013.01); *Y10S 903/93* (2013.01)

(58) Field of Classification Search
CPC ...................................................... B60W 10/26
See application file for complete search history.

(56) References Cited

U.S. PATENT DOCUMENTS

| | | | | |
|---|---|---|---|---|
| 8,164,301 B2 * | 4/2012 | Uchida | ................. | B60K 6/445 320/109 |
| 8,186,465 B2 * | 5/2012 | Oyobe | ................. | B60K 6/26 180/65.275 |

(Continued)

FOREIGN PATENT DOCUMENTS

| | | |
|---|---|---|
| CN | 101253090 A | 8/2008 |
| JP | 2007-062638 A | 3/2007 |

(Continued)

*Primary Examiner* — Adam Tissot
*Assistant Examiner* — Tommy Worden
(74) *Attorney, Agent, or Firm* — Oliff PLC (57) ABSTRACT

A control device is configured to select one of a CD (Charge Depleting) mode in which an SOC of a power storage device is consumed and a CS (Charge Sustaining) mode in which the SOC is maintained within a predetermined range. The CS mode includes a first CS mode selected based on an intention of a driver, and a second CS mode selected when the SOC decreases to a predetermined amount. The predetermined range in the first CS mode is narrower than the predetermined range in the second CS mode. As a result, a distance for which a vehicle can travel using only the drive force of a rotating electric machine after mode switching from the CS mode to the CD mode based on the intention of the driver can be ensured.

5 Claims, 10 Drawing Sheets

(51) Int. Cl.
*B60K 6/442* (2007.10)
*B60K 6/445* (2007.10)
*B60W 50/08* (2012.01)
*B60W 10/06* (2006.01)
*B60W 10/08* (2006.01)
*B60W 10/26* (2006.01)
*B60W 30/182* (2012.01)

(56) References Cited

U.S. PATENT DOCUMENTS

| | | | | |
|---|---|---|---|---|
| 8,229,616 | B2* | 7/2012 | Aridome | B60K 6/445 180/65.265 |
| 8,469,857 | B2* | 6/2013 | Harada | B60K 6/445 477/3 |
| 8,781,665 | B2* | 7/2014 | Yamamoto | B60W 10/08 180/65.23 |
| 8,924,060 | B2* | 12/2014 | Yamamoto | B60W 10/06 180/65.23 |
| 9,014,891 | B2* | 4/2015 | Takayanagi | B60K 6/445 180/65.265 |
| 9,061,682 | B2* | 6/2015 | Morisaki | B60W 10/08 |
| 9,415,698 | B2* | 8/2016 | Sato | B60L 3/0084 |
| 9,428,177 | B2* | 8/2016 | Mori | B60L 11/14 |
| 2003/0015358 | A1* | 1/2003 | Abe | B60K 6/48 180/65.25 |
| 2007/0284248 | A1* | 12/2007 | Kawase | F02D 41/1454 204/424 |
| 2009/0101421 | A1* | 4/2009 | Oyobe | B60K 6/26 180/65.29 |
| 2010/0102776 | A1* | 4/2010 | Uchida | B60K 6/445 320/109 |
| 2011/0160019 | A1* | 6/2011 | Harada | B60K 6/445 477/7 |
| 2011/0166755 | A1* | 7/2011 | Eguchi | B60W 10/06 701/54 |
| 2012/0016547 | A1* | 1/2012 | Aridome | B60K 6/445 701/22 |
| 2013/0024063 | A1* | 1/2013 | Yamamoto | B60W 10/06 701/22 |
| 2013/0030633 | A1* | 1/2013 | Yamamoto | B60W 10/08 701/22 |
| 2013/0030634 | A1* | 1/2013 | Endo | B60K 6/46 701/22 |
| 2013/0041543 | A1* | 2/2013 | Takayanagi | B60K 6/445 701/22 |
| 2013/0226379 | A1* | 8/2013 | Hirai | B60K 6/445 701/22 |
| 2013/0317682 | A1* | 11/2013 | Morisaki | B60K 6/445 701/22 |
| 2015/0102118 | A1* | 4/2015 | Hirabayashi | B60H 1/004 237/12.3 R |
| 2016/0001766 | A1* | 1/2016 | Mori | B60L 11/14 701/22 |
| 2016/0082826 | A1* | 3/2016 | Aoki | B60K 6/445 180/65.23 |
| 2016/0176310 | A1* | 6/2016 | Sato | B60L 3/0084 180/65.25 |
| 2016/0176391 | A1* | 6/2016 | Sato | B60W 10/10 701/22 |
| 2016/0244045 | A1* | 8/2016 | Sato | B60W 20/13 |
| 2016/0244048 | A1* | 8/2016 | Sato | B60W 50/082 |
| 2016/0244052 | A1* | 8/2016 | Hirabayashi | B60K 6/445 |
| 2016/0257294 | A1* | 9/2016 | Morisaki | B60W 20/12 |
| 2016/0264124 | A1* | 9/2016 | Hotta | B60W 20/13 |
| 2016/0272190 | A1* | 9/2016 | Morisaki | B60W 20/12 |
| 2016/0276935 | A1* | 9/2016 | Arai | B60L 11/1803 |

FOREIGN PATENT DOCUMENTS

JP 2009-143563 A 7/2009
JP A-2011-57116 3/2011

* cited by examiner

HYBRID VEHICLE AND CONTROL METHOD FOR HYBRID VEHICLE

This nonprovisional application is based on Japanese Patent Application No. 2013-207380 filed on Oct. 2, 2013 with the Japan Patent Office, the entire contents of which are hereby incorporated by reference.

BACKGROUND OF THE INVENTION

Field of the Invention

The present invention relates to a hybrid vehicle and a control method for the hybrid vehicle, and in particular to a hybrid vehicle equipped with an internal combustion engine and a rotating electric machine as motive power sources and a control method for the hybrid vehicle.

Description of the Background Art

Japanese Patent Laying-Open No. 2011-57116 discloses a hybrid vehicle including an internal combustion engine and a rotating electric machine. The hybrid vehicle travels while switching modes including a CD (Charge Depleting) mode in which the SOC (State Of Charge) of a power storage device is consumed and a CS (Charge Sustaining) mode in which the SOC is maintained within a predetermined range. When the SOC decreases to a predetermined amount, the mode is automatically switched from the CD mode to the CS mode.

It is contemplated that a hybrid vehicle as described above has a configuration in which, even when the SOC is more than the predetermined amount, the mode can be switched to the CS mode based on the intention of a driver (for example, by the driver operating a switch), and the mode can be switched back to the CD mode at desired timing. With this configuration, traveling in the CD mode can be implemented at timing intended by the driver, by preserving the SOC.

However, in a case where the mode is switched from the CD mode to the CS mode based on the intention of the driver and thereafter the mode is switched back from the CS mode to the CD mode, if the SOC is close to a lower limit within the predetermined range, a distance for which the vehicle can travel using only the drive force of the rotating electric machine is shortened.

SUMMARY OF THE INVENTION

Accordingly, an object of the present invention is to ensure, in a hybrid vehicle which can travel while switching modes, a distance for which the vehicle can travel using only the drive force of a rotating electric machine after mode switching from a CS mode to a CD mode based on the intention of a driver.

According to the present invention, a hybrid vehicle includes an internal combustion engine, a power storage device, a rotating electric machine, and a control device. The power storage device is chargeable/dischargeable. The rotating electric machine generates a traveling drive force by receiving supply of electric power from the power storage device. The control device is configured to select one of a CD (Charge Depleting) mode in which an SOC of the power storage device is consumed and a CS (Charge Sustaining) mode in which the SOC is maintained within a predetermined range. The CS mode includes a first CS mode selected based on an intention of a driver, and a second CS mode selected when the SOC decreases to a predetermined amount. The predetermined range in the first CS mode is narrower than the predetermined range in the second CS mode.

With this configuration, the SOC in the first CS mode is maintained in a range narrower than that in the second CS mode. Thereby, a change in the SOC in the first CS mode is suppressed, and as a result, a decrease in the SOC in the first CS mode is suppressed. Accordingly, a residual capacity of the power storage device can be readily ensured in the first CS mode. Therefore, a distance for which the vehicle can travel using only the drive force of the rotating electric machine after mode switching from the CS mode to the CD mode based on the intention of the driver can be ensured in the hybrid vehicle which can travel while switching the modes. Further, in the second CS mode, the hybrid vehicle can be flexibly controlled by allowing a change in the SOC as compared with the first CS mode.

Preferably, in a case where the CS mode is selected, the control device controls a charge/discharge amount for the power storage device based on the SOC, and the control device sets the predetermined range in the first CS mode to be narrower than the predetermined range in the second CS mode, by setting the charge/discharge amount with respect to a change in the SOC when the first CS mode is selected to be larger than that when the second CS mode is selected.

With this configuration, the charge/discharge amount with respect to a change in the SOC in the first CS mode is set to be larger, and thereby the SOC can be maintained within a narrower range. Therefore, the distance for which the vehicle can travel using only the drive force of the rotating electric machine can be further ensured.

Preferably, the control device controls a drive force for the hybrid vehicle based on an accelerator pedal operation amount by the driver, and the control device sets the drive force with respect to the accelerator pedal operation amount when the mode is the first CS mode to be smaller than that when the mode is the second CS mode.

With this configuration, although the charge/discharge amount with respect to a change in the SOC is set to be larger in the first CS mode and thus the output of the internal combustion engine is increased and the internal combustion engine is more likely to be operated at an operating point having a low thermal efficiency, the output of the internal combustion engine can be suppressed by reducing the drive force with respect to the accelerator pedal operation amount. Thereby, the internal combustion engine is more likely to be operated at an operating point having a high thermal efficiency. Therefore, fuel efficiency can be improved without reducing charge/discharge power for the power storage device in the first CS mode.

Preferably, the hybrid vehicle further includes a charging device. The charging device is configured to charge the power storage device by receiving supply of electric power from a power source external to the vehicle. The control device sets the mode to the CD mode after the power storage device is charged by the charging device.

With this configuration, the SOC when the vehicle starts traveling can be increased by the electric power received from the power source external to the vehicle. By switching the mode to the first CS mode in a state where the SOC is high, the residual capacity of the power storage device is preserved in a larger amount. Therefore, the distance for which the vehicle can travel using only the drive force of the rotating electric machine can be further ensured.

Preferably, when the second CS mode is selected, the control device selects the first CS mode based on the intention of the driver, by increasing the SOC to be higher than the predetermined amount.

With this configuration, even when the SOC decreases and the vehicle is traveling in the second CS mode, the CD mode can be performed again by recovering the residual capacity of the power storage device and setting the mode to the first CS mode. Thus, the distance for which the vehicle can travel using only the drive force of the rotating electric machine can be ensured.

Further, according to the present invention, a hybrid vehicle includes an internal combustion engine, a power storage device, and a rotating electric machine. The power storage device is chargeable/dischargeable. The rotating electric machine generates a traveling drive force by receiving supply of electric power from the power storage device. A control method for the hybrid vehicle includes the step of selecting one of a CD (Charge Depleting) mode in which an SOC of the power storage device is consumed and a CS (Charge Sustaining) mode in which the SOC is maintained within a predetermined range. The CS mode includes a first CS mode selected based on an intention of a driver, and a second CS mode selected when the SOC decreases to a predetermined amount. The control method for the hybrid vehicle further includes the step of setting the predetermined range in the first CS mode to be narrower than the predetermined range in the second CS mode.

With this configuration, the SOC in the first CS mode is maintained in a range narrower than that in the second CS mode. Thereby, a change in the SOC in the first CS mode is suppressed, and as a result, a decrease in the SOC in the first CS mode is suppressed. Accordingly, the residual capacity of the power storage device can be readily ensured in the first CS mode. Therefore, a distance for which the vehicle can travel using only the drive force of the rotating electric machine after mode switching from the CS mode to the CD mode based on the intention of the driver can be ensured in the hybrid vehicle which can travel while switching the modes. Further, in the second CS mode, the hybrid vehicle can be flexibly controlled by allowing a change in the SOC as compared with the first CS mode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings. It is noted that identical or corresponding parts in the drawings will be designated by the same reference numerals, and the description thereof will not be repeated.

Embodiment 1

Figure 1:
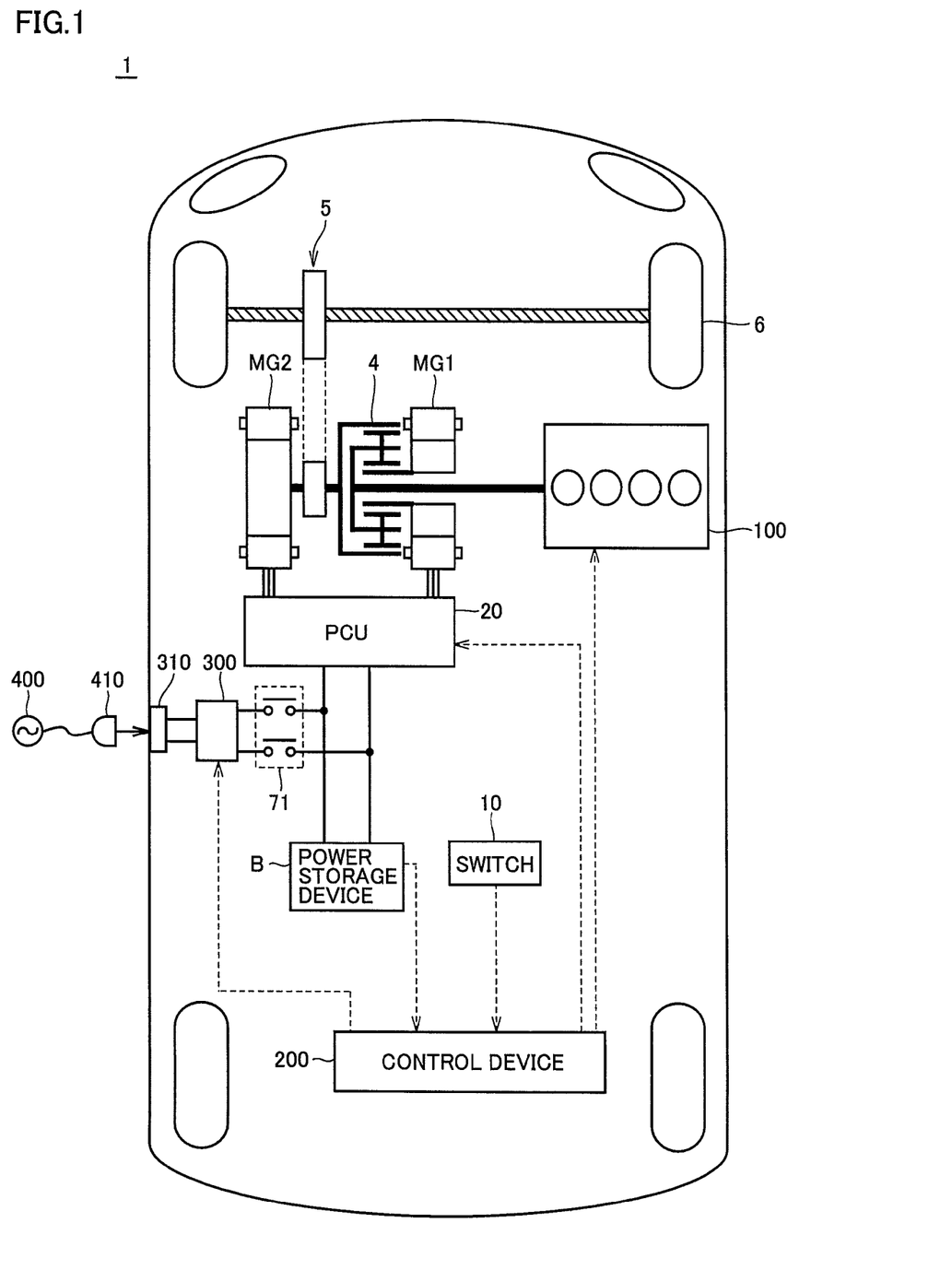
FIG. 1 is a block diagram showing an overall configuration of a hybrid vehicle to which a control device in accordance with Embodiment 1 of the present invention is applied.

FIG. 1 is a block diagram showing an overall configuration of a hybrid vehicle to which a control device in accordance with Embodiment 1 of the present invention is applied. Referring to FIG. 1, a hybrid vehicle 1 includes an engine 100, motor generators MG1, MG2, a motive power split device 4, a reduction mechanism 5, driving wheels 6, a power storage device B, a PCU (Power Control Unit) 20, a switch 10, and a control device 200.

Hybrid vehicle 1 is a so-called plug-in hybrid vehicle. That is, hybrid vehicle 1 can travel using a drive force output from at least one of engine 100 and motor generator MG2, and can charge power storage device B with electric power supplied from a system power source 400 external to the vehicle. It is noted that, hereinafter, a power source external to the vehicle will also be referred to as an "external power source", and charging of power storage device B by an external power source will also be referred to as "external charging".

Engine 100 and motor generators MG1, MG2 are coupled via motive power split device 4. The drive force generated by engine 100 is split into two paths by motive power split device 4. One path transmits the drive force to driving wheels 6 via reduction mechanism 5, and the other path transmits the drive force to motor generator MG1.

Power storage device B is an electric power storing element configured to be chargeable/dischargeable. Power storage device B is configured to include, for example, a secondary battery such as a lithium ion battery, a nickel hydride battery, or a lead storage battery, or a cell of a power storage element such as an electric double layer capacitor. Power storage device B is connected to PCU 20 for driving motor generators MG1, MG2. Power storage device B supplies PCU 20 with electric power for generating a drive force for hybrid vehicle 1. In addition, power storage device B stores electric power generated by motor generators MG1, MG2. Power storage device B has an output of, for example, 200 V. Power storage device B detects a voltage, a current, and a temperature of power storage device B, and outputs detection values thereof to control device 200.

PCU 20 converts direct current (DC) power supplied from power storage device B into alternating current (AC) power to drive motor generators MG1, MG2. PCU 20 also converts AC power generated by motor generators MG1, MG2 into DC power to charge power storage device B.

Switch 10 is a switch for allowing a driver to select a mode of hybrid vehicle 1, as described in detail later. Switch 10 detects an operation of the driver, and outputs a detection result thereof to control device 200.

Hybrid vehicle 1 further includes a charging device 300, a charging port 310, and a relay 71, as components for performing external charging.

Charging port 310 is an electric power interface for receiving the electric power from system power source 400 external to the vehicle (hereinafter referred to as "external electric power"). Charging port 310 is configured to be connectable to a connector 410 connected to system power source 400 external to the vehicle.

Charging device 300 is provided between charging port 310 and power storage device B. Charging device 300 is connected to power storage device B via relay 71. Based on a control signal from control device 200, charging device 300 converts the external electric power (AC power) input to charging port 310 into electric power which is chargeable to power storage device B (DC power), and outputs the DC power to power storage device B. Thereby, power storage device B is charged with the external electric power.

Control device 200 performs various controls such as control of the mode of hybrid vehicle 1, determination whether engine 100 is started/stopped, and charging/discharging control for power storage device B, based on various sensor outputs. Control device 200 generates a control command value for controlling PCU 20, and outputs the generated control command value to PCU 20. Control device 200 generates a control command value for controlling engine 100, and outputs the generated control command value to engine 100. At the time of external charging, control device 200 generates a signal for driving charging device 300, and outputs the generated signal to charging device 300.

Figure 2:
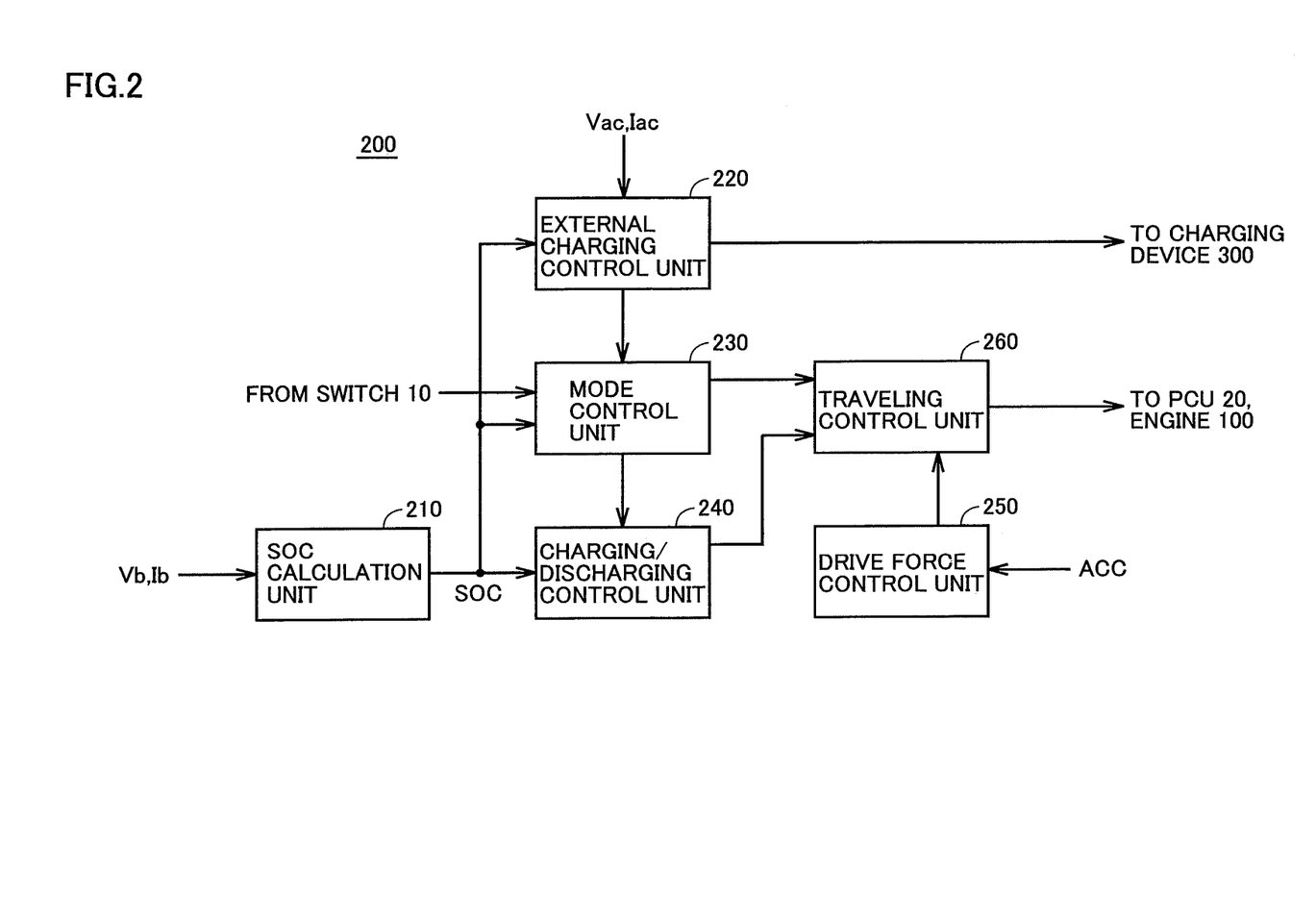
FIG. 2 is a functional block diagram of the control device shown in FIG. 1.

FIG. 2 is a functional block diagram of control device 200 shown in FIG. 1. Functional blocks illustrated in the function block diagram of FIG. 2 are implemented by hardware-based or software-based processing performed by control device 200.

Referring to FIG. 2, control device 200 includes an SOC calculation unit 210, an external charging control unit 220, a mode control unit 230, a charging/discharging control unit 240, a drive force control unit 250, and a traveling control unit 260.

SOC calculation unit 210 calculates the SOC which indicates a charged state of power storage device B, based on a voltage Vb and a current Ib of power storage device B detected by sensors not shown. The SOC is expressed by a ratio (0 to 100%) of the amount of stored power to a fully charged state of power storage device B, and indicates the amount of stored power remaining in power storage device B. It is noted that various known techniques can be used as a method for calculating the SOC.

When the external power source is connected to charging port 310 (FIG. 1), external charging control unit 220 generates a control signal for driving charging device 300 based on an input voltage Vac and an input current Iac detected by sensors not shown, and outputs the control signal to charging device 300. Then, when the SOC of power storage device B received from SOC calculation unit 210 reaches a predetermined upper limit value, external charging control unit 220 terminates charging control, and outputs a charging termination signal which indicates termination of charging to mode control unit 230.

Mode control unit 230 selects the mode of hybrid vehicle 1, based on the SOC calculated by SOC calculation unit 210 and a signal received from switch 10. Specifically, mode control unit 230 sets the mode to one of a CD (Charge Depleting) mode in which the SOC of power storage device B is consumed and a CS (Charge Sustaining) mode in which the SOC is maintained within a predetermined range. The CD mode is a mode in which electric power is consumed without maintaining the SOC of power storage device B. That is, the CD mode is a mode in which electric power is consumed and the SOC of power storage device B decreases. It is noted that, when mode control unit 230 receives the charging termination signal from external charging control unit 220, mode control unit 230 sets the mode to the CD mode.

Figure 3:
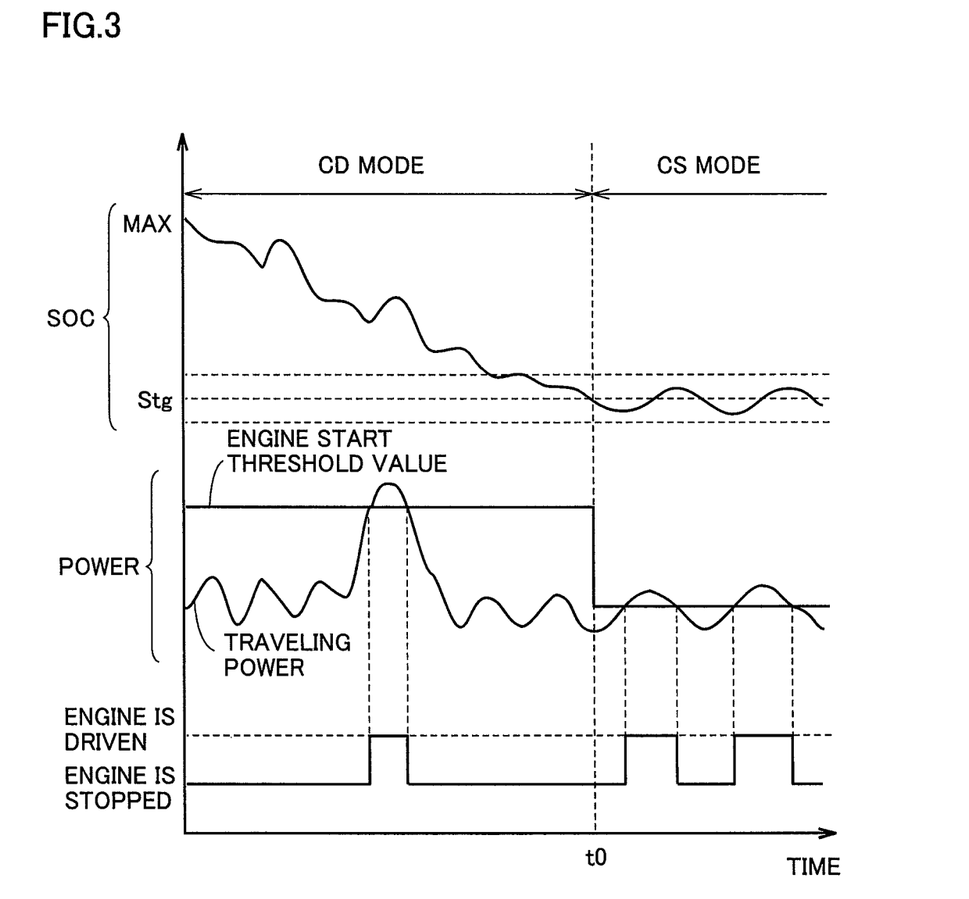
FIG. 3 is a view showing a driving period of an engine in each mode.

FIG. 3 is a view showing a driving period of engine 100 in each mode. As shown in FIG. 3, when traveling power of hybrid vehicle 1 is lower than an engine start threshold value, hybrid vehicle 1 travels using only the drive force of motor generator MG2.

On the other hand, when the traveling power of hybrid vehicle 1 becomes equal to or more than the engine start threshold value, engine 100 enters a driven state. Thereby, hybrid vehicle 1 travels using the drive force of engine 100, in addition to or instead of the drive force of motor generator MG2. Further, electric power generated by motor generator MG1 using the drive force of engine 100 is directly supplied to motor generator MG2.

Here, the engine start threshold value in the CD mode is higher than the engine start threshold value in the CS mode. That is, a range in which engine 100 is stopped and hybrid vehicle 1 travels using only the drive force of motor generator MG2 in the CD mode is greater than a range in which engine 100 is stopped and hybrid vehicle 1 travels using only the drive force of motor generator MG2 in the CS mode. Therefore, in the CD mode, hybrid vehicle 1 is controlled to travel mainly using only the drive force of motor generator MG2, with engine 100 being stopped. On the other hand, engine 100 is driven in the CS mode more frequently than in the CD mode. Therefore, in the CS mode, hybrid vehicle 1 is controlled to travel efficiently, using both engine 100 and motor generator MG2.

Electric power charged to power storage device B in the CD mode is set to be smaller than electric power charged to power storage device B in the CS mode. Specifically, in the CS mode, charging power for power storage device B is set in accordance with the SOC of power storage device B. Engine 100 is driven such that electric power corresponding to the set charging power can be generated using motor generator MG1.

On the other hand, in the CD mode, charging power for power storage device B is generally set to zero. That is, in the CD mode, although electric power obtained by regenerative braking is charged to power storage device B, engine 100 is not driven for the purpose of charging power storage device B. In other words, engine 100 is not operated to maintain the SOC in the CD mode, whereas engine 100 is operated to maintain the SOC in the CS mode. Accordingly, in the CD mode, electric power stored in power storage device B, in particular, electric power supplied from system power source 400 is actively consumed. That is, in the CD mode, the SOC decreases as the travel distance increases. On the other hand, in the CS mode, the SOC of power storage device B is maintained at a predetermined target by operating engine 100.

It is noted that, even in the CD mode, engine 100 is allowed to be operated for example when an accelerator pedal is deeply depressed by the driver, when an engine-driven type air conditioner is operated, and during engine warm-up. The CD mode is a mode in which the vehicle travels basically using the electric power stored in power storage device B as an energy source, without maintaining the SOC of power storage device B. During the CD mode, discharging often eventually accounts for a relatively larger percentage than charging.

On the other hand, the CS mode is a mode in which engine 100 is operated as necessary and electric power is generated by motor generator MG1 in order to maintain the SOC of power storage device B at the predetermined target, and is not limited to traveling with engine 100 being always operated.

That is, even when the mode is the CD mode, engine 100 is operated if the accelerator pedal is deeply depressed and large vehicle power is requested. In addition, even when the mode is the CS mode, engine 100 is stopped if the SOC exceeds a target value. Thus, irrespective of the mode, traveling by stopping engine 100 and using only motor generator MG2 will be referred to as "EV traveling", and traveling by operating engine 100 and using motor generator MG2 and engine 100 will be referred to as "HV traveling". That is, both the EV traveling and the HV traveling can be performed in each of the CD mode and the CS mode. In the CD mode, the EV traveling has a higher priority than the HV traveling.

Here, the CS mode includes a first CS mode and a second CS mode. When switch 10 is operated while the vehicle is traveling in the CD mode, mode control unit 230 sets the mode to the first CS mode. When switch 10 is operated while the vehicle is traveling in the first CS mode, mode control unit 230 sets the mode to the CD mode. When the SOC decreases to a predetermined amount while the vehicle is traveling in the CD mode, mode control unit 230 sets the mode to the second CS mode. Mode control unit 230 outputs a signal which indicates the set mode to charging/discharging control unit 240, drive force control unit 250, and traveling control unit 260.

In addition, a range of the SOC maintained in the first CS mode is narrower than a range of the SOC maintained in the second CS mode. Thereby, a residual capacity of power storage device B can be readily ensured, and a distance for which the EV traveling can be performed when the CD mode is selected by the driver can be ensured.

Figure 4:
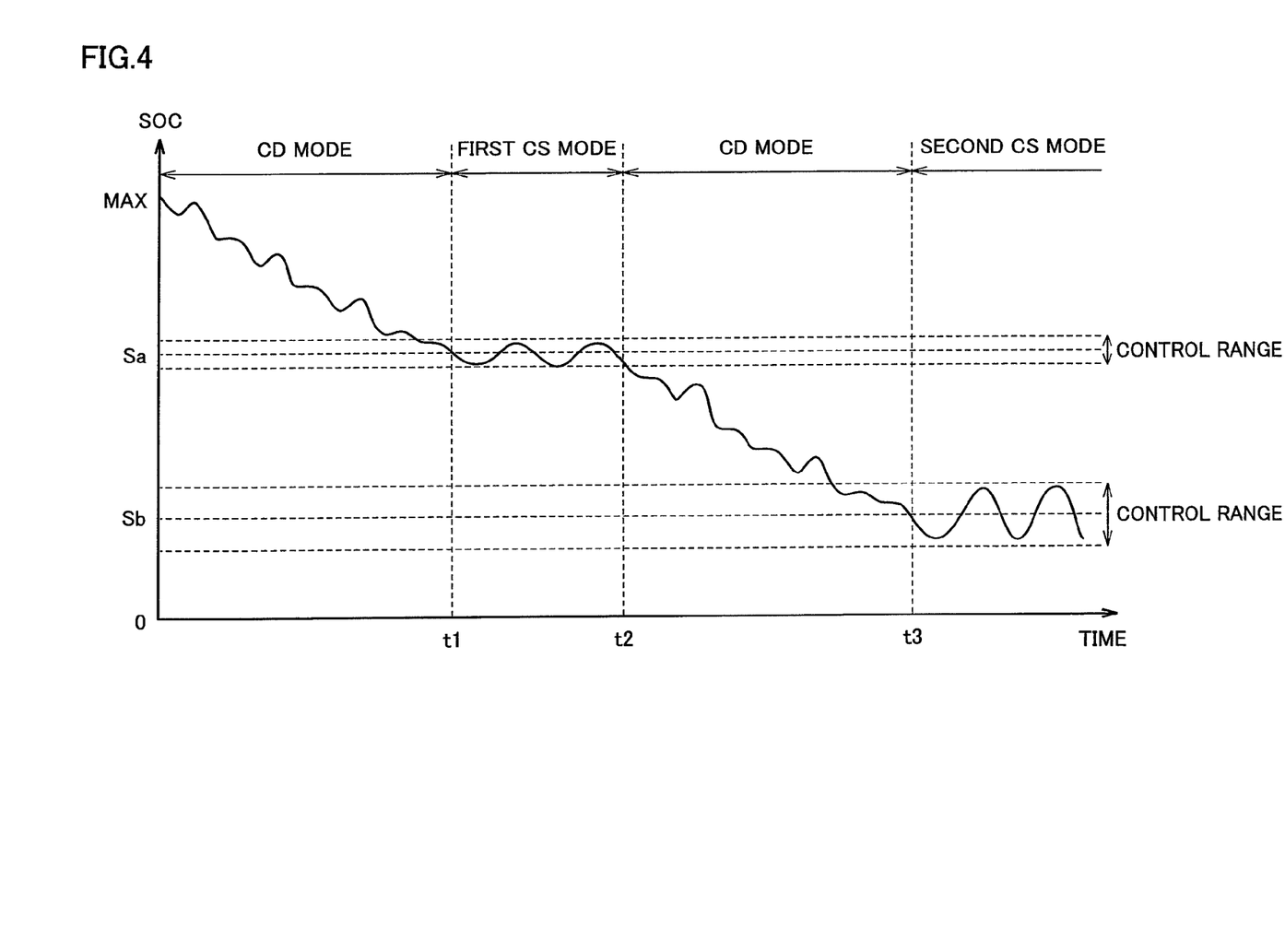
FIG. 4 is a view showing the relation between a change in the SOC of a power storage device and each mode.

FIG. 4 is a view showing the relation between a change in the SOC of power storage device B and each mode. Referring to FIG. 4, it is assumed that traveling is started after power storage device B is fully charged (SOC=MAX) by external charging. After external charging, the mode is set to the CD mode. While the vehicle is traveling in the CD mode, the SOC decreases as a whole as the travel distance increases, although the SOC may temporarily increase by regenerative power recovered for example during deceleration of the vehicle. Then, when switch 10 is operated by the driver at a time t1, the mode is switched to the first CS mode, and the SOC is controlled to close to a target value Sa.

When switch 10 is operated again by the driver at a time t2, the mode is switched to the CD mode. When the SOC further decreases at a time t3, the mode is switched to the second CS mode, and the SOC is controlled to close to a target value Sb. As shown in FIG. 4, the range of the SOC maintained in the first CS mode is narrower than the range of the SOC maintained in the second CS mode.

Referring to FIG. 2 again, charging/discharging control unit 240 receives the SOC of power storage device B from SOC calculation unit 210, and receives the signal which indicates the mode from mode control unit 230. Based on these signals, charging/discharging control unit 240 controls a charge/discharge amount for power storage device B to maintain the SOC in the first and second CS modes.

Figure 5:
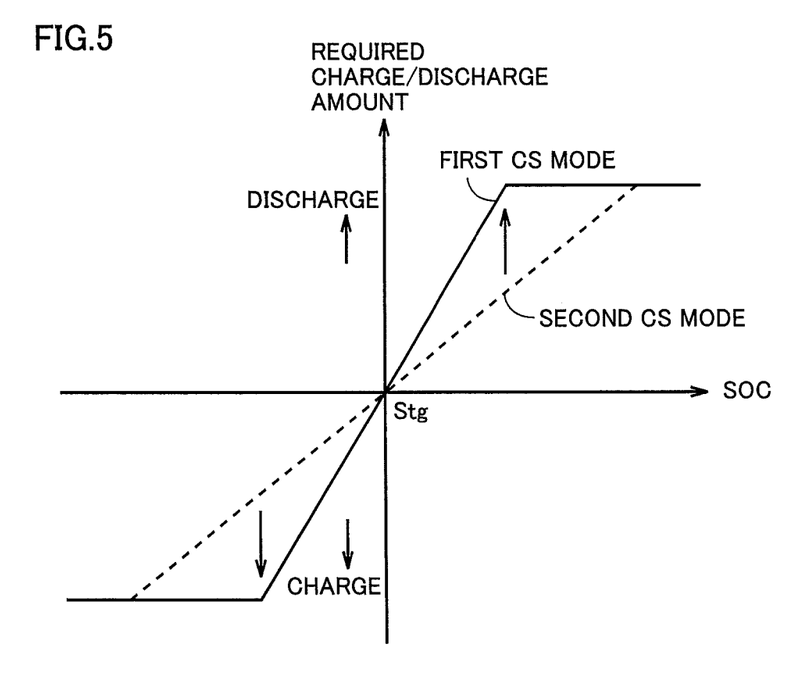
FIG. 5 is a view showing the relation between the SOC of the power storage device and a required charge/discharge amount.

FIG. 5 is a view showing the relation between the SOC of power storage device B and a required charge/discharge amount. Referring to FIG. 5, a positive required charge/discharge amount indicates a required discharge amount for power storage device B, and a negative required charge/discharge amount indicates a required charge amount for power storage device B. When the SOC of power storage device B is higher than a target value Stg, as the SOC increases, the required charge/discharge amount increases, that is, the required discharge amount increases. On the other hand, when the SOC of power storage device B is lower than target value Stg, as the SOC decreases, the required charge/discharge amount decreases, that is, the required charge amount increases.

Here, charging/discharging control unit 240 sets the required charge/discharge amount with respect to a change in the SOC in the first CS mode to be larger than that in the second CS mode. That is, when the SOC is higher than target value Stg, electric power larger than that in the second CS mode is discharged in the first CS mode. On the other hand, when the SOC is lower than target value Stg, electric power larger than that in the second CS mode is charged in the first CS mode.

Thereby, the SOC can be brought close to target value Stg in the first CS mode more quickly than in the second CS mode. As a result, in the first CS mode, the SOC is maintained in a range narrower than that in the second CS mode (FIG. 4). Thus, a change in the SOC in the first CS mode is suppressed, and as a result, a decrease in the SOC in the first CS mode is suppressed. Accordingly, the residual capacity of power storage device B can be readily ensured. Therefore, the distance for which the EV traveling can be performed when the CD mode is selected by the driver can be ensured. Further, in the second CS mode, hybrid vehicle 1 can be flexibly controlled by allowing a change in the SOC. Charging/discharging control unit 240 outputs a calculated required charge/discharge amount to traveling control unit 260.

Referring to FIG. 2 again, drive force control unit 250 controls the drive force for hybrid vehicle 1 based on an accelerator pedal operation by the driver. Specifically, drive force control unit 250 calculates a required drive force such that the drive force for hybrid vehicle 1 is increased with an increase in an accelerator pedal opening degree. Drive force control unit 250 outputs the calculated required drive force to traveling control unit 260.

Traveling control unit 260 controls PCU 20 and engine 100 based on the mode, the required charge/discharge amount, and the required drive force. Specifically, when the mode is the CD mode, the SOC is not maintained, and thus basically motor generator MG2 is driven using energy output from power storage device B, based on the required drive force.

On the other hand, when the mode is the first or second CS mode, outputs of engine 100 and power storage device B are controlled to maintain the SOC. Specifically, traveling control unit 260 calculates required engine power based on the required charge/discharge amount and the required drive force. Traveling control unit 260 controls engine 100 based on the required engine power, and controls an output of motor generator MG2 based on the required drive force.

Figure 6:
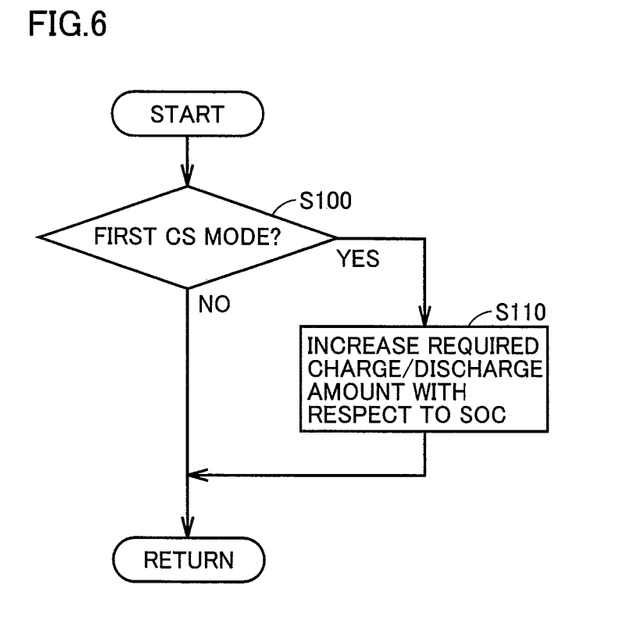
FIG. 6 is a flowchart illustrating a control structure of charging/discharging control performed by the control device shown in FIG. 1.

FIG. 6 is a flowchart illustrating a control structure of charging/discharging control performed by control device 200 shown in FIG. 1. The flowchart illustrated in FIG. 6 is implemented by executing a program stored beforehand in control device 200 with a predetermined cycle. Alternatively, for part of the steps, processing can be implemented by establishing exclusive hardware (electronic circuit) (the same applies to the flowchart illustrated in FIG. 11 described later).

Referring to FIG. 6, in step (hereinafter abbreviated as S) 100, control device 200 determines whether or not the mode is the first CS mode. When control device 200 determines that the mode is not the first CS mode (NO in S100), subsequent processing is skipped and the processing is returned to the main routine.

When control device 200 determines that the mode is the first CS mode (YES in S100), control device 200 increases the required charge/discharge amount with respect to the SOC (S110). Thereby, in the first CS mode, the SOC is maintained in a range narrower than that in the second CS mode.

As described above, in Embodiment 1, the SOC in the first CS mode is maintained in a range narrower than that in the second CS mode. Thereby, a change in the SOC in the first CS mode is suppressed, and as a result, a decrease in the SOC in the first CS mode is suppressed. Accordingly, the residual capacity of power storage device B can be readily ensured in the first CS mode. Therefore, the distance for which the EV traveling can be performed after mode switching from the CS mode to the CD mode based on the intention of the driver can be ensured in the hybrid vehicle which can travel while switching the modes. Further, in the second CS mode, hybrid vehicle 1 can be flexibly controlled by allowing a change in the SOC.

In addition, in Embodiment 1, the charge/discharge amount with respect to the SOC in the first CS mode is set to be larger than that in the second CS mode. Thus, the SOC can be maintained within a narrower range. Therefore, the distance for which the EV traveling can be performed can be further ensured.

In addition, in Embodiment 1, after power storage device B is charged by charging device 300, the mode is set to the CD mode. Thereby, the SOC when the vehicle starts traveling can be increased by the electric power received from system power source 400. By switching the mode to the first CS mode in a state where the SOC is high, the residual capacity of power storage device B is preserved in a larger amount. Therefore, the distance for which the EV traveling can be performed can be further ensured.

Embodiment 2

Figure 7:
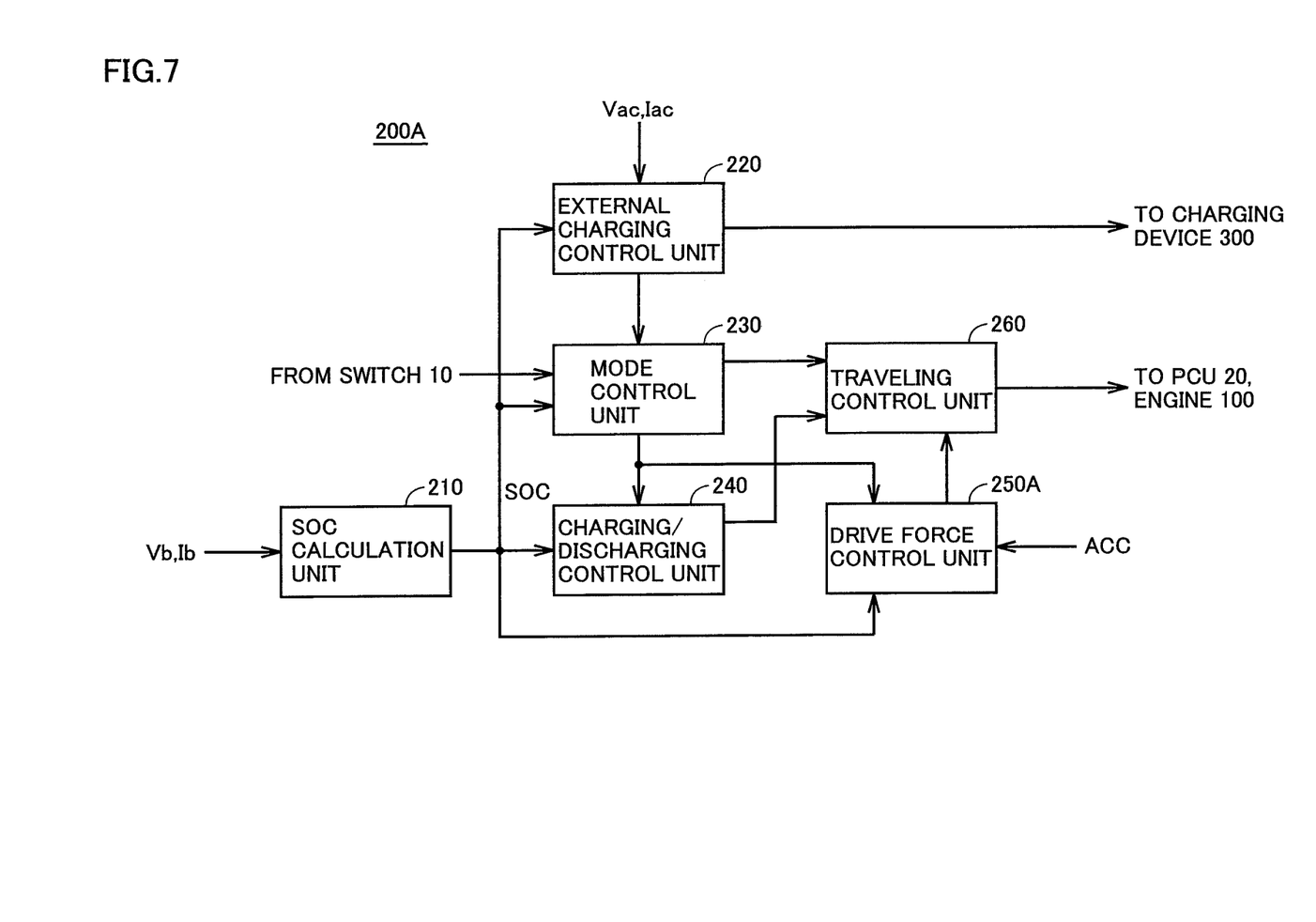
FIG. 7 is a functional block diagram of a control device in accordance with Embodiment 2 of the present invention.

FIG. 7 is a functional block diagram of a control device 200A in accordance with Embodiment 2 of the present invention. Referring to FIG. 7, control device 200A is different from control device 200 in that it includes a drive force control unit 250A instead of drive force control unit 250. It is noted that components of a hybrid vehicle 1A and other components of control device 200A in accordance with Embodiment 2 are identical to those in Embodiment 1.

Figure 8:
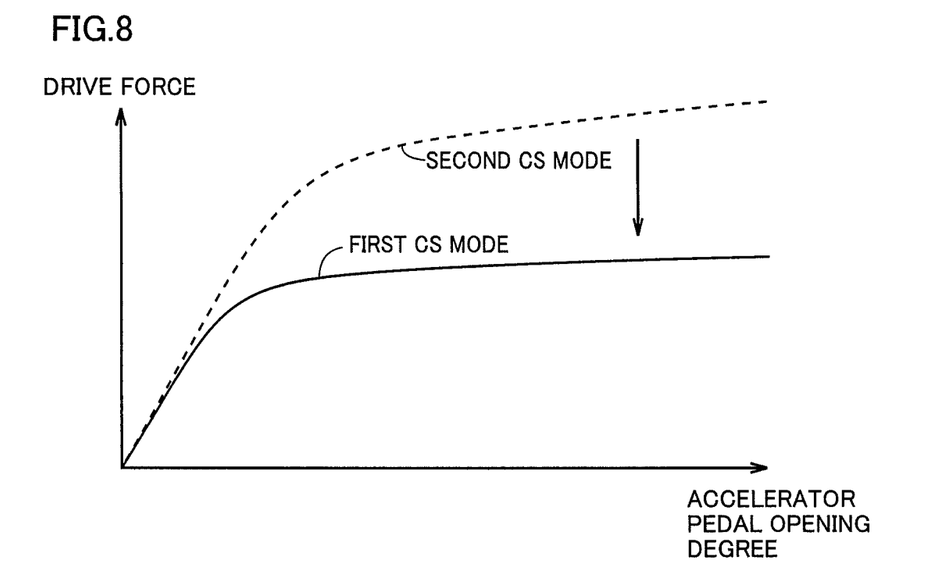
FIG. 8 is a view showing the relation between an accelerator pedal opening degree and a drive force for the hybrid vehicle.
Figure 9:
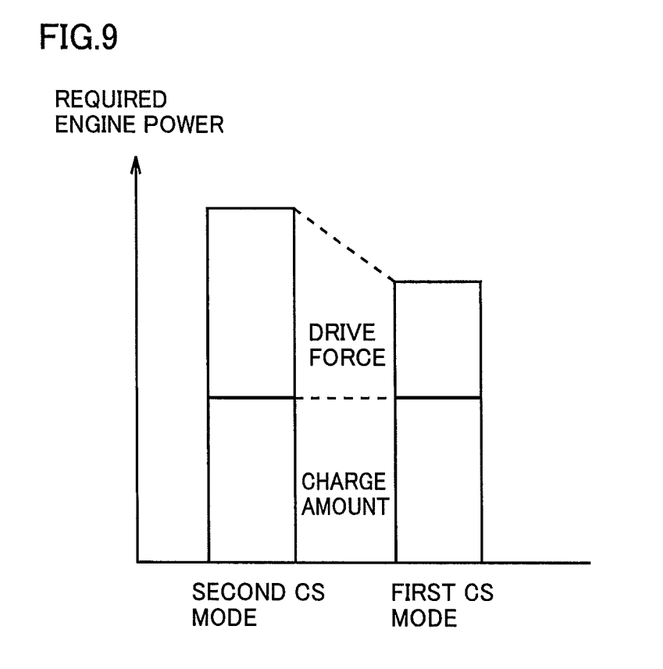
FIG. 9 is a view showing required engine power in each mode.

FIG. 8 is a view showing the relation between an accelerator pedal opening degree and a drive force for the hybrid vehicle. Referring to FIGS. 7 and 8, drive force control unit 250A calculates a required drive force so as to set a drive force with respect to an accelerator pedal operation amount when the first CS mode is selected to be smaller than that when the second CS mode is selected. Thus, as shown in FIG. 9, at an identical accelerator pedal opening degree, required engine power is reduced when the first CS mode is selected, as compared with the case where the second CS mode is selected.

Figure 10:
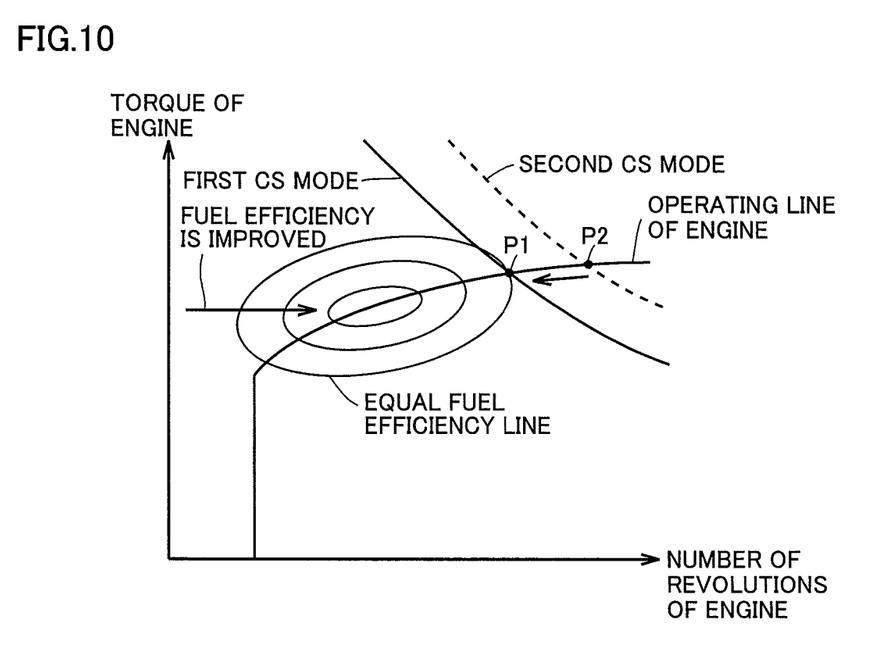
FIG. 10 is a view showing an operation line of the engine.

FIG. 10 is a view showing an operation line of engine 100. In FIG. 10, the axis of abscissas indicates the number of revolutions of the engine, and the axis of ordinate indicates the torque of the engine. It is noted that circles indicated by solid lines in FIG. 10 represent equal fuel efficiency lines. An equal fuel efficiency line is a line connecting points having equal fuel efficiency, and fuel efficiency is improved as the position is closer to the center of the circle. It is assumed that engine 100 is basically operated on the operation line of the engine indicated by a solid line in FIG. 10.

Referring to FIG. 10, in Embodiment 2, at an identical accelerator pedal opening degree, the required engine power when the first CS mode is selected is smaller than the required engine power when the second CS mode is selected. As a result, at the identical accelerator pedal opening degree, when the second CS mode is selected, engine 100 is operated at an operating point P2, whereas when the first CS mode is selected, engine 100 is operated at an operating point P1 which has better fuel efficiency than that at operating point P2. Thus, even when the required charge/discharge amount is increased by selecting the first CS mode, an increase in the required engine power is suppressed by reducing the required drive force, and thus a deterioration in the thermal efficiency of engine 100 can be suppressed.

Figure 11:
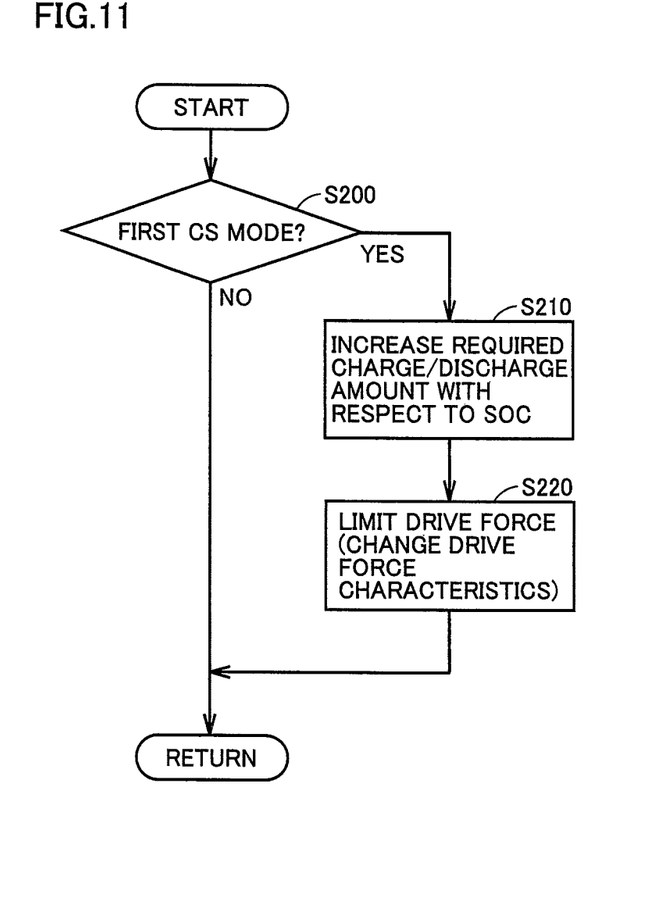
FIG. 11 is a flowchart illustrating a control structure of charging/discharging control and drive force control performed by the control device in accordance with Embodiment 2 of the present invention.

FIG. 11 is a flowchart illustrating a control structure of charging/discharging control and drive force control performed by control device 200A in accordance with Embodiment 2 of the present invention.

Referring to FIG. 11, in S200, control device 200A determines whether or not the mode is the first CS mode. When control device 200A determines that the mode is not the first CS mode (NO in S200), subsequent processing is skipped and the processing is returned to the main routine.

When control device 200A determines that the mode is the first CS mode (YES in S200), control device 200A increases the required charge/discharge amount with respect to the SOC (S210). Thereby, in the first CS mode, the SOC is maintained in a range narrower than that in the second CS mode.

Next, in S220, control device 200A changes drive force characteristics with respect to the accelerator pedal opening degree. Specifically, control device 200A calculates the required drive force so as to set the drive force with respect to the accelerator pedal operation amount when the first CS mode is selected to be smaller than that when the second CS mode is selected.

It is noted that control device 200A may limit the drive force only when the SOC is lower than a specified value X in S220. Specified value X is a value for determining a decrease in the SOC, and the required charge amount is significantly increased when the SOC is lower than specified value X. In this case, the drive force can be prevented from being limited more than necessary, and a deterioration in driveability can be suppressed.

As described above, in Embodiment 2, the drive force with respect to the accelerator pedal operation amount when the first CS mode is selected is set to be smaller than that when the second CS mode is selected. As a result, although the charge/discharge amount with respect to a change in the SOC is set to be larger in the first CS mode and thus the output of engine 100 is increased and engine 100 is more likely to be operated at an operating point having a low thermal efficiency, the output of engine 100 can be suppressed by reducing the drive force with respect to the accelerator pedal operation amount. Thereby, engine 100 is more likely to be operated at an operating point having a high thermal efficiency. Therefore, fuel efficiency can be improved without reducing charge/discharge power for power storage device B in the first CS mode.

It is noted that, in the embodiments described above, while the vehicle is traveling in the second CS mode, the mode may be switched to the first CS mode based on the intention of the driver, by increasing the SOC to be higher than the SOC at which the mode is switched to the second CS mode. In this case, even when the SOC decreases and the vehicle is traveling in the second CS mode, the CD mode can be performed again by recovering the residual capacity of power storage device B and setting the mode to the first CS mode. Thus, the distance for which the EV traveling can be performed can be ensured.

Although the embodiments described above have described a case where the SOC is maintained within a predetermined range by adjusting the charge/discharge amount with respect to a change in the SOC in the CS mode, an upper limit value and a lower limit value of the SOC may be set in the CS mode, and the charge/discharge amount may be adjusted such that the SOC is maintained between the upper limit value and the lower limit value.

In addition, although the embodiments described above have described a series/parallel type hybrid vehicle in which motive power of engine 100 can be split by motive power split device 4 and transmitted to driving wheels 6 and motor generators MG1, MG2, the present invention is also applicable to other types of hybrid vehicles. That is, the present invention is also applicable to, for example, a so-called series-type hybrid vehicle in which engine 100 is used only for driving motor generator MG1 and only motor generator MG2 generates a drive force for the vehicle, a hybrid vehicle in which only regeneration energy of kinetic energy generated by engine 100 is recovered as electric energy, and a motor-assisted type hybrid vehicle in which an engine is used as a main motive power source and assisted by a motor as necessary. Further, the present invention is also applicable to a hybrid vehicle which travels using only motive power of an engine with a motor being disconnected.

In addition, the method of supplying electric power from system power source 400 to charging port 310 is not limited to a contact-type power transmission method in which electric power is transmitted by bringing connector 410 connected to system power source 400 into contact with charging port 310. A non-contact-type power transmission method may also be used, such as power transmission using electromagnetic induction, power transmission using electromagnetic waves, or power transmission by a so-called resonance method.

It is noted that, in the above description, engine 100 corresponds to one embodiment of an "internal combustion engine" in the present invention, and motor generator MG2 corresponds to one embodiment of a "rotating electric machine" in the present invention.

Although the embodiments of the present invention have been described, it should be understood that the embodiments disclosed herein are illustrative and non-restrictive in every respect. The scope of the present invention is defined by the scope of the claims, and is intended to include any modifications within the scope and meaning equivalent to the scope of the claims.

What is claimed is:

1. A hybrid vehicle, comprising:
    an internal combustion engine;
    a chargeable/dischargeable power storage device;
    a rotating electric machine generating a traveling drive force by receiving supply of electric power from said power storage device; and
    a control device configured to select one of a CD (Charge Depleting) mode in which an SOC of said power storage device is consumed and a CS (Charge Sustaining) mode in which said SOC is controlled to close to a target value,
    wherein said CS mode includes a first CS mode selected based on an operation of a switch by a driver, and a second CS mode selected when said SOC decreases to a predetermined amount,
    when said first CS mode is selected, said control device starts to control said SOC to close to the target value set by referring to said SOC at a point when said first CS mode is selected by the driver operating the switch,
    when the CS mode is selected, the control device controls a charge/discharge amount for the power storage device based on the SOC, and
    the control device sets the charge/discharge amount so that the SOC closes to the target value faster in the first CS mode than in the second CS mode.

2. The hybrid vehicle according to claim 1, wherein said control device controls a drive force for said hybrid vehicle based on an accelerator pedal operation amount by the driver, and
    said control device sets said drive force with respect to said accelerator pedal operation amount when said first CS mode is selected to be smaller than that when said second CS mode is selected.

3. The hybrid vehicle according to claim 1, further comprising a charging device configured to charge said power storage device by receiving supply of electric power from a power source external to the vehicle,
    wherein said control device selects said CD mode after said power storage device is charged by said charging device.

4. The hybrid vehicle according to claim 1, wherein, when said second CS mode is selected, said control device selects said first CS mode based on an intention of the driver, by increasing said SOC to be higher than said predetermined amount.

5. A control method for a hybrid vehicle, said hybrid vehicle including
    an internal combustion engine,
    a chargeable/dischargeable power storage device, and
    a rotating electric machine generating a traveling drive force by receiving supply of electric power from said power storage device,
    said control method comprising the steps of:
    selecting one of a CD (Charge Depleting) mode in which an SOC of said power storage device is consumed and a CS (Charge Sustaining) mode in which said SOC is controlled to close to a target value, said CS mode including a first CS mode selected based on an operation of a switch by a driver, and a second CS mode selected when said SOC decreases to a predetermined amount;
    when said first CS mode is selected, starting to control the SOC to close to the target value set by referring to said SOC at a point when said first CS mode is selected by the driver operating the switch,
    when the CS mode is selected, controlling a charge/discharge amount for the power storage device based on the SOC, and
    setting the charge/discharge amount so that the SOC closes to the target value faster in the first CS mode than in the second CS mode.

* * * * *